April 24, 1951 R. B. DE LANO, JR 2,549,895
ELECTRONIC SWITCHING DEVICE
Filed Oct. 4, 1946
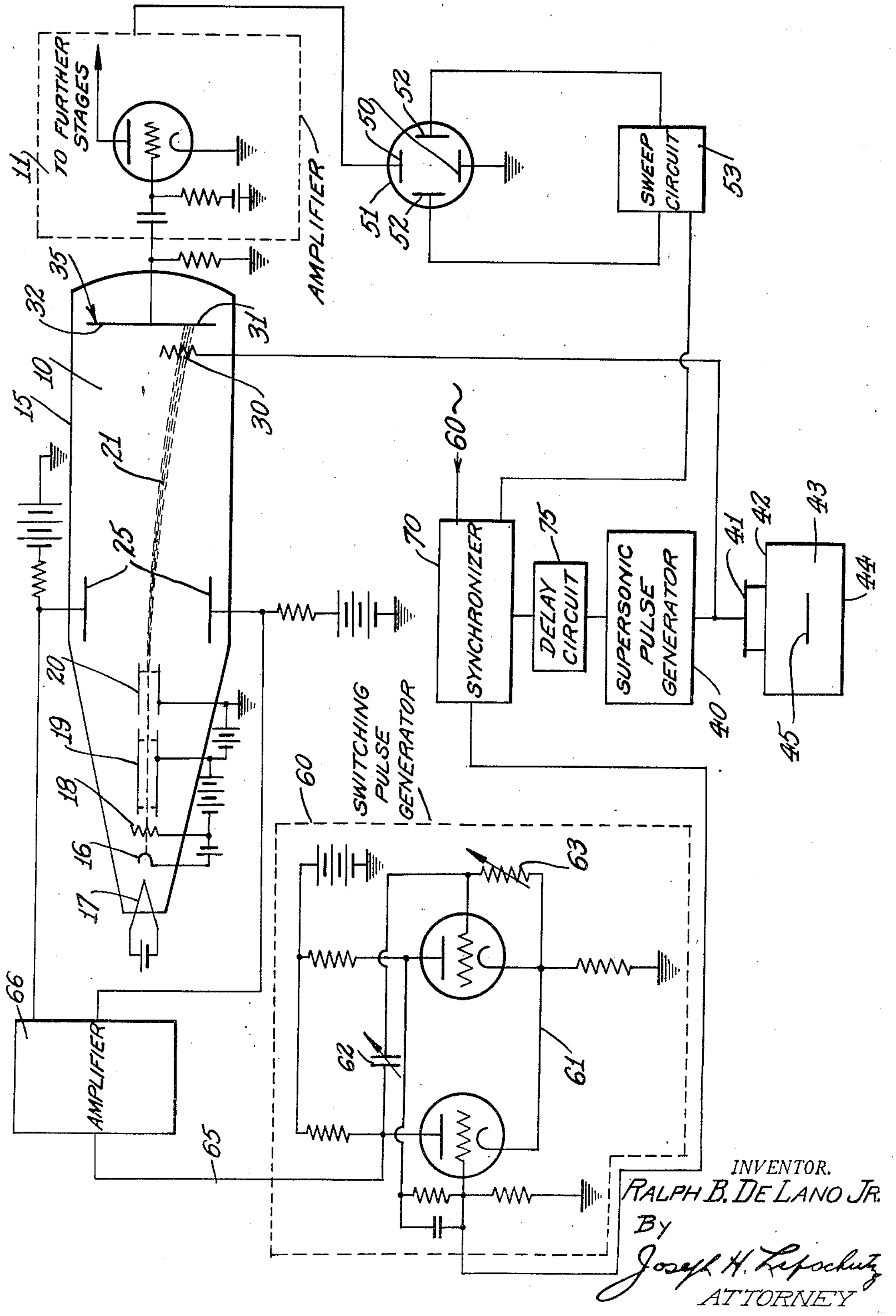
INVENTOR.
RALPH B. DE LANO JR.
By
Joseph H. Lipschutz
ATTORNEY Patented Apr. 24, 1951 2,549,895

UNITED STATES PATENT OFFICE 2,549,895

ELECTRONIC SWITCHING DEVICE

Ralph B. De Lano, Jr., New York, N. Y., assignor to Sperry Products, Inc., Hoboken, N. J., a corporation of New York Application October 4, 1946, Serial No. 701,319

6 Claims. (Cl. 73—67)

This invention relates to a method and means for connecting and disconnecting an input signal from a thermionic amplifier. Such a device has many applications, principally in those instances where signals within a given range of magnitude are normally applied to an amplifier and it is desired to disconnect the source of signals from the amplifier when the signals are of a higher magnitude than normal. Thus, for example in rail testing devices where an electro-inductive pickup normally cuts a given number of lines of force surrounding the rail to generate E. M. F.'s of a given magnitude which are passed into an amplifier, it is not desirable that the much greater E. M. F.'s generated at rail joints be passed into the amplifier because such greater signals would overload the amplifier and render it ineffective for a period following the rail joint where testing is desired.

Another application of this invention may very well be in supersonic testing of materials by means of a supersonic beam which is generated by impressing a voltage on a piezo-electric element such as a crystal to send a supersonic beam into a workpiece being tested and receiving the reflections of said supersonic beam either by the same crystal or another crystal. The voltage generated by the reflections are of a smaller order of magnitude than the voltages impressed on the crystal for the purpose of initiating the pulse and it is desirable that the amplifier be cut out during that interval when the initial, high voltage pulse is impressed on the crystal since such pulse would overload the amplifier and render it ineffective to receive reflections of the supersonic beam within the material for an interval following the impressing of the pulse on the crystal.

It is, therefore, one of the principal objects of this invention to provide an electronic switching mechanism in combination with an amplifier so that the amplifier will not be affected by signals in excess of a given magnitude.

It is a further object of this invention to provide an electronic switching device in combination with a supersonic testing assembly whereby the amplifier will be rendered ineffective during the generation of the initial pulse but will be rendered effective when the pulse ends.

Further objects and advantages of this invention will become apparent in the following detailed description thereof.

The accompanying drawing is a diagrammatic representation of one embodiment of this invention.

Referring to the drawing, I have shown my electronic switching device 10 having its output connected to an amplifier 11, and the said tube 10 being so constructed that undesired signal voltages will not be passed by the tube to amplifier 11.

To accomplish the above result the tube 10 consists of an envelope 15 which encloses certain of the conventional elements of a cathode ray tube. Among these elements are a cathode 16 which may be heated by a heater element 17, a grid 18 and beam-forming elements 19 and 20, all of said elements being supplied with suitable voltages so that an electron beam 21 will be generated and directed toward the right end of the tube in the drawing. It is well known that the path of such electron beam 21 may be controlled by setting up a suitable electric or magnetic field as, for instance, by a magnet or by impressing a suitable voltage across plates 25. The voltage normally impressed on plates 25 is such that the beam 21 is directed in a path which strikes a signal grid 30 which cooperates with a portion 31 of a plate 35. If the signal placed upon grid 30 varies, the output of the tube taken off plate 35 will vary and can then be impressed on amplifier 11 which is an A. C. amplifier designed to pass fluctuating voltages.

If now a situation is encountered wherein an abnormally large signal may be impressed on grid 30 to cause a sudden and abnormally large output from tube 10, which output would be capable of overloading amplifier 11 and rendering the amplifier insensitive for an interval after the large signal has ceased, it is desirable to render the output of tube 10 insensitive to such signal. For this purpose a pulse synchronized to such large signal is adapted to be impressed on plates 25 in such manner as to overcome the normal voltage on said plates and to set up an electric field which will cause electron beam 21 to be drawn out of its normal path where it intercepts signal grid 30. Thus, in the figure, the beam 21 would be switched upwardly out of the path of grid 30 and would strike the upper portion 32 of plate 35. In other words, the large signal which is now coming through on grid 30 has no effect on the electron beam because the electron beam no longer intercepts the signal grid 30 due to the fact that the beam 21 has been diverted out of the path of the grid 30 by impressing a synchronized pulse upon the plates 25. The electron beam 21, being a fairly steady beam, causes a steady output from plate 35 and since the amplifier 11 is an A. C. amplifier, the steady state output from plate 35 will not be passed by amplifier 11; or, if the amplifier 11 were a D. C. amplifier, an opposing D. C. bias equal to the normal D. C. output generated when beam 21 strikes portion 32 can be provided.

While it will be apparent that the switching arrangement described above has many uses, I have disclosed one application thereof in connection with the testing of materials by means of a supersonic beam. One such system is disclosed in the patent to Floyd A. Firestone, No. 2,280,226, granted April 21, 1940, and consists in generating a wave train or pulse of a supersonic frequency by means of a pulse generator 40 which applies such wave train or pulse to a piezo-electric element such as a quartz crystal 41 in contact with the upper surface 42 of an object 43 to be tested. The wave train travels through the material and is reflected back by any reflecting surface, such as the opposite surface 44 of the material or by a defect such as 45 present in the material. The reflected wave trains may be received either by the same crystal 41 or by a separate crystal and the voltage thus generated may be amplified and impressed on a suitable indicator. As here disclosed the same crystal 41 is used for sending and receiving of the voltages generated by crystal 41 and impressed on the signal grid 30 to cause a varying output from plate 35 which is amplified by amplifier 11 and then impressed on the vertical plates 50 of an oscilloscope 51 to deflect vertically a horizontal sweep impressed across horizontal plates 52 from a sweep circuit 53.

In the above arrangement it will be apparent that not only will the voltages generated by reflections of the wave train received by crystal 41 be impressed on the signal grid 30 but the initial relatively higher voltage pulse generated by pulse generator 40 will also be impressed on the signal grid 30. This initial voltage of the impressed pulse is so large that it will cause such a relatively large output from plate 35 as to overload the amplifier 11. The result of this will be that when the pulse has terminated, the amplifier will not be ready to receive impulses caused by reflections of the wave train received by crystal 41 from within material 43 for a predetermined interval of time. This means that if there is a defect 45 lying close to the surface 42, these reflections will not be indicated because the amplifier 11 will not be in condition to amplify them due to the time interval necessary for the amplifier 11 to become sensitive again.

Therefore, my electron tube 10 can be utilized to prevent the amplifier 11 from having the large initial pulse impressed across its input. Thus overloading will be obviated and amplifier 11 will be able to amplify voltages generated by the crystal in response to received reflections instantly when the pulse generation terminates. For this purpose I cause to be generated slightly in advance of the initial pulse a voltage of the proper magnitude and sign to deflect beam 21 during the interval that the pulse is being generated. Such voltage may be generated by a switching pulse generator 60 which may take the form of a flip-flop or single shot multi-vibrator circuit 61 which generates a square wave whose duration may be controlled by a variable condenser 62 and variable resistor 63. Such square wave is impressed by connection 65 on an amplifier 66 whose output is applied to the plates 25. To insure that the switching pulse is generated simultaneously with the supersonic pulse both the switching pulse generator 60 and the supersonic pulse generator 40 are triggered from a synchronizer 70 which in turn is triggered from a synchronizing frequency which may be a 60 cycle A. C. source. Thus, if the latter source is employed, 60 cycles each second the supersonic pulse generator 40 and the switching pulse generator 60 will be rendered effective, and the duration of the switching pulse as adjusted by controls 62 and 63 is such that the switching pulse is applied to plates 25 for an interval corresponding to the duration of the generated supersonic pulse. During this interval the beam 21 will be deflected out of the path of signal grid 30 and will not be passed by amplifier 11. Therefore, as soon as the supersonic pulse generation has ended, the switching pulse will also end and the normal voltages applied to plates 25 will deflect beam 21 into the path of signal grid 30. Thereafter the voltages generated by crystal 41 in response to reflections of the wave train from within material 43 will be effective to vary the output of plate 35 and such variation in output will be passed by amplifier 11 and will be indicated on oscilloscope 51. To compensate for the time of movement of beam 21 from its lower to its upper position the delay circuit 75 of any known type may be interposed between synchronizer 70 and the supersonic pulse generator 40 so that the supersonic pulse generation will begin a brief interval of time after the switching pulse has been applied to plates 25 and corresponding to the time of travel of the beam from lower to upper position.

Plate 35 in the electron device 10 is extended beyond signal grid 30 so that the electron beam 21 strikes this plate even though the switching pulse generator is deflecting the beam away from grid 30. If this were not the case, movement of the beam back and forth by the deflecting electrodes 25 would cause a large transient to be generated across the input of the amplifier 11.

The foregoing description of the invention is merely illustrative and changes may be made within the scope of the appended claims.

Having described my invention, what I claim and desire to secure by Letters Patent is:

1. In a device of the type described, comprising an electronic switch tube, means for generating a pulse signal, an amplifier, the amplifier being adapted to pass fluctuating voltages, said tube including a cathode, an anode, means for generating a beam of electrons between said cathode and anode, and an input signal grid cooperating with the anode, the anode being connected to the input of the amplifier, means for normally maintaining the beam at rest in engagement with the signal grid, and means for preventing a given signal on the signal grid from passing through said amplifier, said preventing means comprising means responsive to said signal for deflecting the beam out of engagement with the signal grid.

2. In a device of the type described, comprising an electronic switch tube, means for generating a pulse signal, an amplifier, the amplifier being adapted to pass fluctuating voltages, said tube including a cathode, an anode, means for generating a beam of electrons between said cathode and anode, and an input signal grid cooperating with the anode, the anode being connected to the input of the amplifier, means for normally maintaining the beam at rest in engagement with the signal grid, and means for preventing a given signal on the signal grid from passing through said amplifier, said preventing means comprising means responsive to and synchronized with said given signal for deflecting the beam out of engagement with the signal grid.

3. In a device of the type described, comprising an electronic switch tube, means for generating a pulse signal, an amplifier, the amplifier being adapted to pass fluctuating voltages, said tube including a cathode, an anode, means for generating a beam of electrons between said cathode and anode, and an input signal grid cooperating with the anode, the anode being connected to the input of the amplifier, deflecting means for the electron beam, means for normally applying a voltage to the deflecting means adapted to maintain the beam at rest in engagement with the signal grid, and means for preventing a given signal on the signal grid from passing through said amplifier, said preventing means comprising means responsive to said signal for applying a voltage to said deflecting means adapted to deflect the beam out of engagement with the signal grid.

4. In a supersonic testing system, means for generating supersonic pulses, means for transmitting the pulses into an object under test and for receiving reflections of said pulses, an amplifier, an indicator actuated by the output from said amplifier, and means for preventing the signal due to the generation of the pulse from passing through the amplifier, said preventing means comprising an electron switch tube, said tube including a cathode, an anode, means for generating a beam of electrons between said cathode and anode, and an input signal grid cooperating with the anode, the anode being connected to the input of the amplifier, the signal grid being connected to said transmitting and receiving means, means for normally maintaining the beam at rest in engagement with the signal grid, and means synchronized with the generation of the pulse for deflecting the beam out of engagement with the signal grid.

5. In a supersonic testing system, means for generating supersonic pulses, means for transmitting the pulses into an object under test and for receiving reflections of said pulses, an amplifier, an indicator actuated by the output from said amplifier, and means for preventing the signal due to the generation of the pulse from passing through the amplifier, said preventing means comprising an electron switch tube, said tube including a cathode, an anode, means for generating a beam of electrons between said cathode and anode, and an input signal grid cooperating with the anode, the anode being connected to the input of the amplifier, the signal grid being connected to said transmitting and receiving means, means for normally maintaining the beam at rest in engagement with the signal grid, means synchronized with the generation of the pulse for deflecting the beam out of engagement with the signal grid, and means for limiting the duration of the last-named means to the period of generation of the pulse.

6. In a supersonic testing system, means for generating supersonic pulses, means for transmitting the pulses into an object under test and for receiving reflections of said pulses, an amplifier, an indicator actuated by the output from said amplifier, and means for preventing the signal due to the generation of the pulse from passing through the amplifier, said preventing means comprising an electron switch tube, said tube including a cathode, an anode, means for generating a beam of electrons between said cathode and anode, and an input signal grid cooperating with the anode, the anode being connected to the input of the amplifier, the signal grid being connected to said transmitting and receiving means, deflecting means for the electron beam, means for normally applying a voltage to the deflecting means adapted to maintain the beam at rest in engagement with the signal grid, and means synchronized with the generation of the pulse for applying a voltage to said deflecting means adapted to deflect the beam out of engagement with the signal grid.

RALPH B. DE LANO, Jr.

REFERENCES CITED

The following references are of record in the file of this patent:

UNITED STATES PATENTS

| Number | Name | Date |
|---|---|---|
| 2,131,993 | Wittkuhns et al. | Oct. 4, 1938 |
| 2,185,693 | Mertz | Jan. 2, 1940 |
| 2,280,226 | Firestone | Apr. 21, 1942 |